April 7, 1925.
J. BLACKBURN
BRAKING DEVICE
Filed Oct. 10, 1921
1,532,868
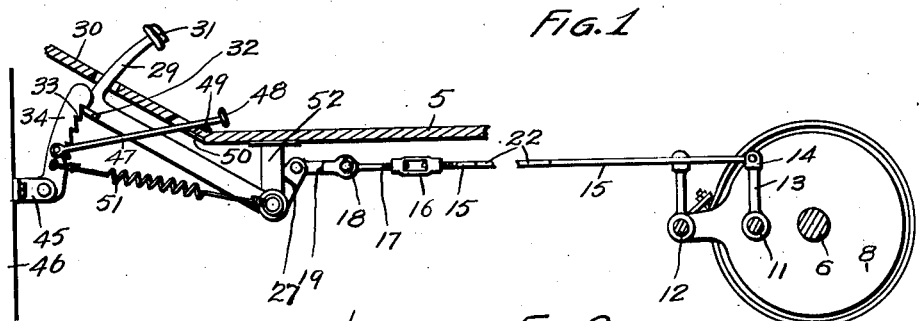
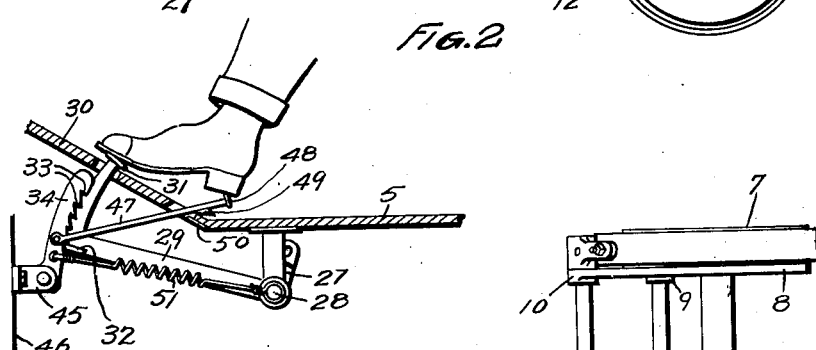
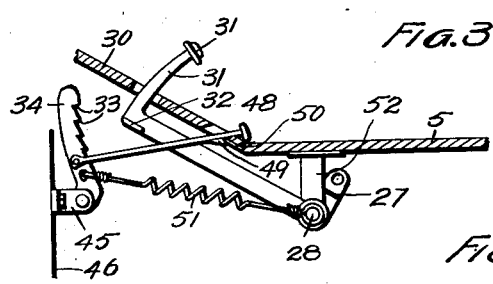
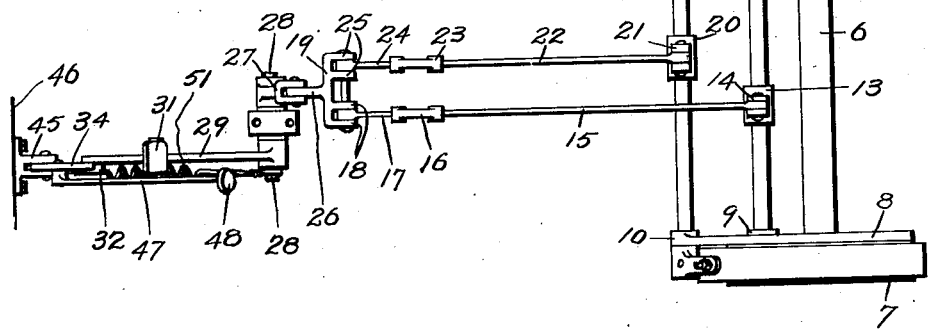
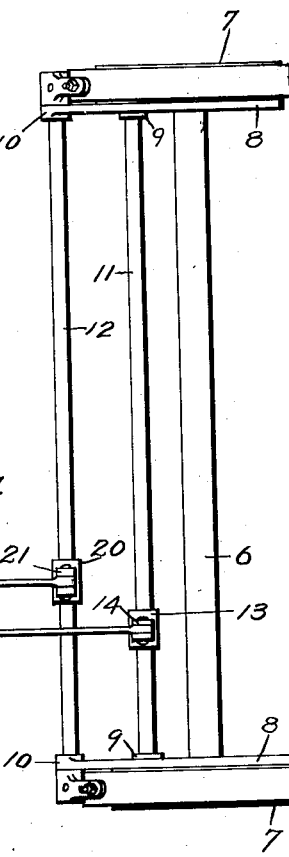
INVENTOR
JASPER BLACKBURN
By Edward E. Longan
ATTY.

Patented Apr. 7, 1925.

1,532,868

UNITED STATES PATENT OFFICE.

JASPER BLACKBURN, OF WEBSTER GROVES, MISSOURI.

BRAKING DEVICE.

Application filed October 10, 1921. Serial No. 506,567.

*To all whom it may concern:*

Be it known that I, JASPER BLACKBURN, a citizen of the United States, and resident of the city of Webster Groves, county of St. Louis, and State of Missouri, have invented certain new and useful Improvements in Braking Devices, of which the following is a specification containing a full, clear, and exact description, reference being had to the accompanying drawings, forming a part hereof.

My invention relates to improvements in braking devices and has for its primary object a braking device intended especially for automobiles, wherein the service and emergency brakes are set simultaneously and by one forward movement.

A further object is to construct a braking device for automobiles and the like, in which the emergency and service brakes are set simultaneously, thus eliminating an excessive amount of wear on one set of brake bands.

A still further object is to construct a braking device wherein the brake bands of the service and emergency brakes are set simultaneously, and which can be locked in set position.

In the drawings,

Fig. 1 is a side elevation of my device as attached to an automobile, and operated by a foot pedal, showing the same in released position.

Fig. 2 is a similar view of the front portion of my braking device, showing the brakes set and locked, and the manner of releasing the lock and brakes.

Fig. 3 is a side elevation of the forward portion of my device, showing the locking mechanism designated.

Fig. 4 is a top plan view of my device illustrating the manner of connecting the same to the brakes.

In the construction of my device I make use of an automobile having a floor 5, and rear axle 6. Adjacent each end of the axle is mounted a brake drum 7. Secured around the brake drum and within the same are brake bands of the service and emergency brakes. This being well known in automobile construction will not be described in detail. Adjacent the inner faces of the brake drums are plates 8 which are provided with bosses 9 and 10, and in these bosses are mounted shafts 11 and 12. The shaft 11 operating the emergency brake bands and the shaft 12 the service brake bands. Secured to the shaft 11 is a lever 13 which has its upper end 14 forked to receive the brake rod 15. This brake rod has secured to its end a turn buckle 16, to which is also secured a rod 17. The turn buckle being for the purpose of taking up the wear of or adjusting the brake bands. The rod 17 is pivoted between the ears 18 formed on the double clevis 19. Secured to the shaft 12 is a lever 20, having its upper end 21 forked, and in this forked portion is located a brake rod 22 which has its forward end secured in the turn buckle 23, and to this turn buckle is secured a rod 24 which is pivoted between the ears 25 of the clevis 19. The clevis 19 has an ear 26 formed integral therewith which is pivotally secured in the forked end of the lever 27. This lever is mounted on one end of a shaft 28. On the opposite end of the shaft 28 is secured a foot lever 29 which extends through the foot board 30 of the automobile, and which is provided on its upper end with the foot plate 31. The foot lever 29 has formed integral with its forward end a dog 32, which is designed to engage with ratchet teeth 33 formed on the pawl 34. This pawl is pivotally mounted in a bracket 45 which is secured preferably to the engine frame 46. Pivotally secured to the pawl 34 is a rod 47 which projects through the foot board and has formed on its end a button 48 and a tooth 49. The tooth 49 is adapted to contact with the plate 50 secured to the underside of the foot board, and hold the pawl 34 out of engagement with the dog 32. (See Fig. 3.) Secured to the pawl 34 is one end of a coil spring 51, its opposite end being secured either to the shaft 28 or to the body of the automobile. This spring is for the purpose of holding the pawl 34 against the dog 32 at all times except when the tooth 49 is engaged with the plate 50. Secured to the underside of the floor 5 is a bracket 52. This bracket is preferably so located that the lever 27 and foot lever 28 are on opposite sides thereof.

It will be noted from Fig. 4 that the button 48 is to one side of the foot plate 31. The purpose of this will be explained later.

The operation of my device is as follows:

After the device has been installed on a machine, the turn buckles 16 and 23 are adjusted so that the emergency and service brake bands will be set equally and simultaneously, and then the device is set in the position as stated in Fig. 1. If it is desired to bring the car to a stop and keep the brakes in locked position, the foot lever 29 is depressed. The spring 51 drawing forward on the pawl 34 allows the dog 32 to ride downward past the several notches 33. When the brakes have been set, the foot is removed and the pawl locks the brakes in set position by preventing the lever 29 from rising. When it is desired to release the brake, the toe of the foot is put on the plate 31, the heel brought in contact with the button 48, then a slight downward pressure is imparted to the foot lever 29. The heel of the foot is then pushed forward which releases the pawl from engagement with the dog 32. Then if the operator desires, he may push the rod 47 forward so that the tooth 49 will come in engagement with the plate 50. This holds the pawl in the position shown in Fig. 3. The lever 29 is allowed to raise and the brakes are released. While driving the car it is preferable to leave the pawl 34 in the position shown in Fig. 3 so that the brakes can be set and released as required, without any possibility of their becoming locked. It is also possible to ascertain by the use of my device, as to whether the brakes will lock or be released when the foot is again taken off of the plate 31, by the position the button 48 assumes with respect to the foot-board.

By the use of my device the brake bands of an automobile are worn equally and since the braking at all times occurs on four bands instead of two, the life of the brake bands is at least double. The possibility of only one wheel still being locked while the other is still free to turn, and thus cause skidding, is eliminated, as well as the rapidity of which brakes can be set. There being only one movement necessary to accomplish this, while in the present structure of automobiles, two movements are necessary—the one to set the service brake, the other to emergency. This setting of the emergency brakes in cars, also requires the removal of one hand from the steering wheel, thus reducing the driver's control of the machine and increasing the liability of serious accident.

Having fully described my invention, what I claim is:

1. A braking device comprising in combination with an automobile having service and emergency brakes, a pair of levers for operating said brakes, brake rods attached to said levers, a foot lever for operating said brake rods, a dog formed integral with said foot lever, a pivotally mounted pawl provided with ratchet teeth adapted to normally engage with said dog secured to said automobile, and a foot rod for releasing said pawl from engagement with the dog.

2. A braking device for automobiles, comprising a set of brakes, an engine frame, a foot lever for setting said brakes, a spring actuated pawl pivotally secured to the engine frame for holding the foot lever in depressed position, thereby holding the brakes in set position, and a rod for releasing said pawl from engagement.

3. A braking device for automobiles, comprising service and emergency brakes, an engine frame, a foot lever for setting said brakes, a spring actuated pawl pivotally secured to the engine frame for holding the foot lever in depressed position, thereby holding the brakes in set position, and a rod for releasing said pawl from engagement.

4. The braking device of claim 2, in which the releasing rod is provided with means for holding the pawl out of engagement with the foot lever.

5. The braking device of claim 3, in which the pawl releasing rod is provided with means for holding the pawl out of engagement with the foot lever.

In testimony whereof, I have signed my name to this specification.

JASPER BLACKBURN.